US012625030B2

(12) United States Patent
Yang et al.

(10) Patent No.:  US 12,625,030 B2
(45) Date of Patent:  May 12, 2026

(54) MULTI-PHYSICS FIELD COUPLING ENVIRONMENT SIMULATION DEVICE

(71) Applicant: UESTC (SHENZHEN) ADVANCED RESEARCH INSTITUTE, Shenzhen (CN)

(72) Inventors: Jun Yang, Shenzhen (CN); Chen Zhao, Shenzhen (CN); Meng Liu, Shenzhen (CN); Qiuquan Guo, Shenzhen (CN); Caizheng Wang, Shenzhen (CN); Dongxing Zhang, Shenzhen (CN); Wenchao Xiao, Shenzhen (CN)

(73) Assignee: UESTC (SHENZHEN) ADVANCED RESEARCH INSTITUTE, Shenzhen (CN)

( * ) Notice: Subject to any disclaimer, the term of this patent is extended or adjusted under 35 U.S.C. 154(b) by 0 days.

(21) Appl. No.: 19/275,917

(22) Filed: Jul. 21, 2025

(65) Prior Publication Data

US 2025/0362199 A1    Nov. 27, 2025

(30) Foreign Application Priority Data

May 24, 2024    (CN) .......................... 202410651137.7

(51) Int. Cl.
*G01M 9/04*         (2006.01)
(52) U.S. Cl.
CPC ..................................... *G01M 9/04* (2013.01)
(58) Field of Classification Search
None
See application file for complete search history.

(56) References Cited

U.S. PATENT DOCUMENTS 5,025,659 A    6/1991  Starr, Jr.
5,495,754 A    3/1996  Starr, Jr.
(Continued)

FOREIGN PATENT DOCUMENTS

CN    102944145 A    2/2013
CN    104280204 A    1/2015
(Continued)

OTHER PUBLICATIONS

Chen Gong et al. "Test of ice shedding on turbofan engine blade in refrigeratory environment" Journal of Beijing University of Aeronautics and Astronautics, pp. 2106-2114 Oct. 31, 2018.
(Continued)

*Primary Examiner* — Peter J Macchiarolo
*Assistant Examiner* — Jermaine L Jenkins
(74) *Attorney, Agent, or Firm* — Fideli Law PLLC; Qiang Li

(57)            ABSTRACT

The invention belongs to the technical field of wind tunnel simulation, and particularly relates to a multi-physics field coupling environment simulation device, which comprises a base, an upper surface of the base is fixedly connected with a simulation cabin, one side wall of the simulation cabin is provided with a plurality of horizontal flow fans, a plurality of rotating flow fans arranged around the simulation cabin by a circle are mounted on the upper surface of the base, and a top portion of the simulation cabin is provided with a plurality of vertical flow fans. The multi-physics field coupling environment simulation device of the invention is used for simulating complex environments of three-dimensional multi-physics field coupling under different weathers, which improves the diversity of wind tunnel tests.

11 Claims, 13 Drawing Sheets

(56)     References Cited

U.S. PATENT DOCUMENTS

| | | | | |
|---|---|---|---|---|
| 6,378,361 B1 * | 4/2002 | Larsen | .................... | G01M 9/04 |
| | | | | 73/147 |
| 10,775,265 B2 * | 9/2020 | Dowgwillo | ............ | G01N 19/00 |

FOREIGN PATENT DOCUMENTS

| | | | | | | |
|---|---|---|---|---|---|---|
| CN | 110132522 | A | * | 8/2019 | ........... | G01M 10/00 |
| CN | 209543634 | U | | 10/2019 | | |
| CN | 110681418 | A | | 1/2020 | | |
| CN | 111189606 | A | | 5/2020 | | |
| CN | 113984328 | A | * | 1/2022 | ........... | G01M 9/065 |
| RU | 176214 | U1 | | 1/2018 | | |

OTHER PUBLICATIONS

The Notice of Grant for China Application No. 202410651137.7, Jan. 14, 2025.

\* cited by examiner

MULTI-PHYSICS FIELD COUPLING ENVIRONMENT SIMULATION DEVICE

RELATED APPLICATIONS

This application claims the benefit of priority of Chinese application number 202410651137.7, filed on May 24, 2024. The entire contents of the above-mentioned applications are incorporated herein by reference.

TECHNICAL FIELD

The present invention belongs to the technical field of wind tunnel simulation, and is particularly a multi-physics field coupling environment simulation device.

BACKGROUND

Low-altitude flight equipment is more and more widely used in daily life, such as a multi-rotor unmanned aerial vehicle, and a flying car or a future urban aircraft is also a hot topic and a research and development direction nowadays. In a taking off or flying process of the low-altitude flight equipment, a surrounding wind environment is an important factor affecting the flight equipment, so that people need to simulate a surrounding wind field environment during working of the flight equipment through a wind tunnel.

The wind tunnel is the most commonly used and effective tool to artificially generate and control an air flow, and carry out aerodynamics and wind engineering tests, people test the flight equipment in many aspects such as free flight testing, landing phase optimization, vertical take-off and landing transition in flight, and flight stability through the wind tunnel, and then the flight equipment is designed, tested and optimized.

However, at present, in most common wind tunnel tests, a single-dimensional wind field is adopted, which can only simulate an aerodynamic influence of a single wind field on the flight equipment, and cannot simulate a common complex wind field environment in nature, so that there are certain limitations.

SUMMARY

In order to solve the above problems in the background, the present invention provides a multi-physics field coupling environment simulation device, wherein testers simulate other wind field environments in nature through the cooperation of vertical flow fans, horizontal flow fans and rotating flow fans according to actual needs, and common complex wind field environments in nature may be simulated through the cooperation of the vertical flow fans, the horizontal flow fans and the rotating flow fans, thus achieving an effect of improving the diversity of wind tunnel tests.

The present invention provides a multi-physics field coupling environment simulation device, which comprises a base, wherein an upper surface of the base is fixedly connected with a simulation cabin, one side wall of the simulation cabin is provided with a plurality of horizontal flow fans, a plurality of rotating flow fans arranged around the simulation cabin by a circle are mounted on the upper surface of the base, and a top portion of the simulation cabin is provided with a plurality of vertical flow fans.

Further, the simulation cabin is fixedly connected with a supporting frame for supporting the horizontal flow fans, one side of the supporting frame close to an interior of the simulation cabin is fixedly connected with a first fixing frame, a plurality of first deflectors distributed in a vertical direction are rotatably connected in the first fixing frame, the upper surface of the base is fixedly connected with a plurality of second fixing frames, and each second fixing frame is rotatably connected with a plurality of second deflectors distributed in a horizontal direction.

Further, the top portion of the simulation cabin is fixedly connected with a fixed box communicated with the vertical flow fans, the top portion of the simulation cabin is provided with a ventilation hole communicated with the fixed box, a hood is fixedly connected inside the top portion of the simulation cabin, a bottom portion of the hood is provided with a sliding groove, a moving plate is arranged in the hood a bottom portion of the moving plate is connected with a connecting tube which is communicated with the moving plate and penetrates through the sliding groove, and a bottom portion of the connecting tube is fixedly connected with an air outlet tube.

Further, a moving frame is arranged in the simulation cabin, and a plurality of moving fans are mounted on the moving frame.

Further, the upper surface of the base is fixedly connected with a cabin body arranged outside the simulation cabin.

Further, a spray nozzle, a refrigerating module, a heating module, an illuminating module and a snowing module are mounted in the simulation cabin.

Further, the base is provided with a rotary table.

Further, a stretchable plate for covering the sliding groove is arranged between a side wall of the moving plate and an inner wall of the hood.

Further, a first driving assembly for adjusting an angle of the first deflector is arranged between the first fixing frame and the first deflector.

Further, a second driving assembly for adjusting an angle of the second deflector is arranged between the second fixing frame and the second deflector.

Further, a moving assembly for driving the moving plate to move is arranged between the moving plate and the hood.

Further, a pair of side walls of the connecting tube are slidably inserted with a pair of wind shields respectively, and an opening and closing assembly is arranged between each wind shield and the side wall of the connecting tube.

Further, the first driving assembly comprises a first motor fixedly connected with a side wall of the first fixing frame, an output shaft of the first motor is fixedly connected with a first synchronous pulley, a side wall of the first deflector is fixedly connected with a first rotating rod rotatably connected with the first fixing frame, the first rotating rod is fixedly connected with a second synchronous pulley, and the first synchronous pulley and the second synchronous pulley are connected by a first synchronous belt.

Further, the second driving assembly comprises a second motor fixedly connected with a side wall of the second fixing frame, an output shaft of the second motor is fixedly connected with a third synchronous pulley, a side wall of the second deflector is fixedly connected with a second rotating rod rotatably connected with the second fixing frame, the second rotating rod is fixedly connected with a fourth synchronous pulley, and the third synchronous pulley and the fourth synchronous pulley are connected by a second synchronous belt.

Further, the moving assembly comprises a pair of sliding rails fixedly connected with an inner wall of the bottom portion of the hood, a lower surface of the moving plate is fixedly connected with a slider corresponding to the sliding rail, a lower surface of the slider is provided with a reserved groove, a plurality of rotating wheels abutting against the sliding rail are arranged in the reserved groove, a side wall of the slider is fixedly connected with a third motor corresponding to the rotating wheels, and an output shaft of the third motor is fixedly connected with the rotating wheels.

Further, the opening and closing assembly comprises a fourth motor fixedly connected with the side wall of the connecting tube, an output shaft of the fourth motor is fixedly connected with a gear, a lower surface of the wind shield is fixedly connected with a rack engaged with the gear, and the rack is slidably inserted with the connecting tube.

Compared with the prior art, the present invention has the beneficial effects as follows:

(1) Testers may also simulate other wind field environments in nature through the cooperation of the vertical flow fans, the horizontal flow fans and the rotating flow fans according to actual needs, and common complex wind field environments in nature may be simulated through the cooperation of the vertical flow fans, the horizontal flow fans and the rotating flow fans, thus achieving an effect of improving the diversity of wind tunnel tests.

(2) A tornado can be simulated through the cooperation of the vertical flow fans and the rotating flow fans, thus achieving an effect of further improving the diversity of wind tunnel tests.

(3) The moving frame is arranged to simulate crossroad wind, thus improving the diversity of wind tunnel tests.

(4) Different wind field environments are simulated according to actual needs, rain, snow, freezing rain and ice accretion, and different temperature environments are chosen according to actual conditions, and then the vertical flow fans, the horizontal flow fans, the rotating flow fans and the moving fans are cooperated to simulate complex environments of three-dimensional multi-physics field coupling under different weather, thus improving the diversity of wind tunnel tests.

BRIEF DESCRIPTION OF THE DRAWINGS

In order to illustrate the technical solutions in the embodiments of the present invention or in the prior art more clearly, the drawings used in the description of the embodiments or the prior art will be briefly described below. Obviously, the drawings in the following description are merely some embodiments recorded in the present invention. For those of ordinary skills in the art, other drawings may also be obtained based on these drawings without going through any creative work.

Figure 1:
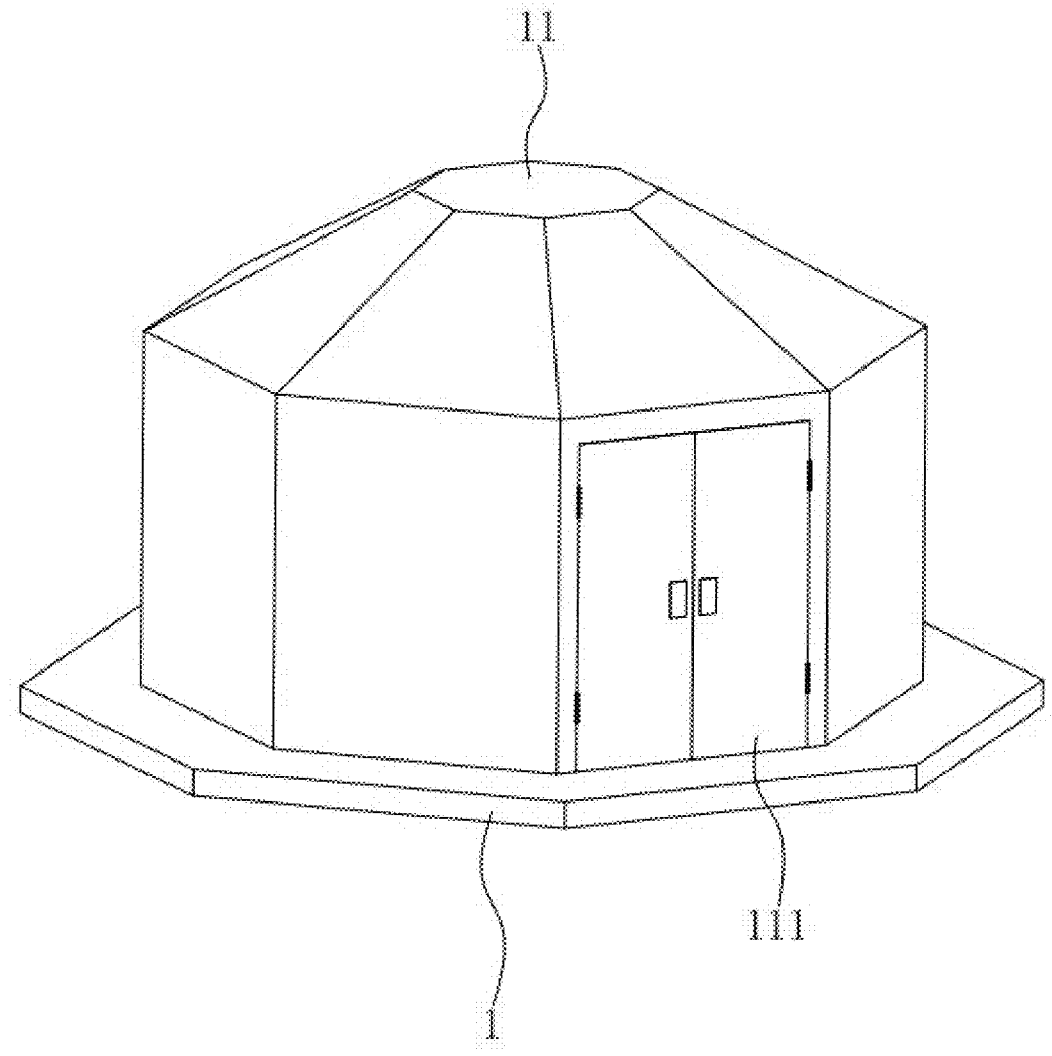
FIG. 1 is a schematic diagram of an embodiment of the present application.
Figure 2:
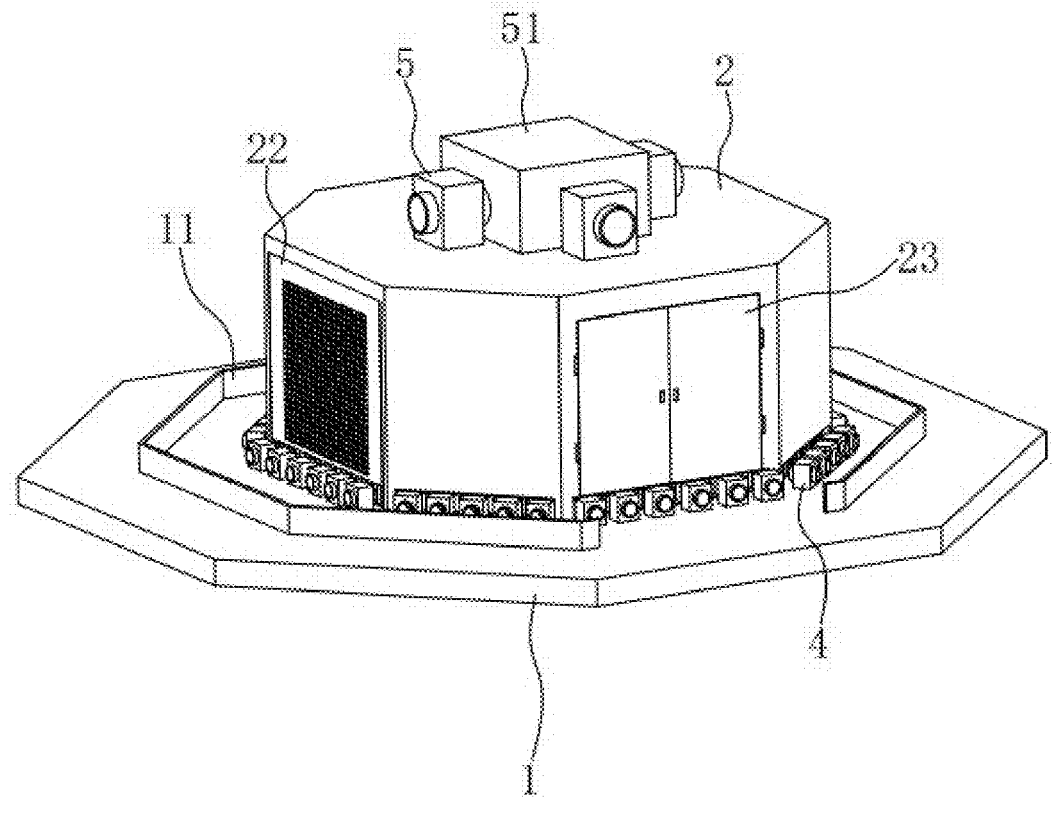
FIG. 2 is a schematic diagram of a simulation cabin in the embodiment.
Figure 3:
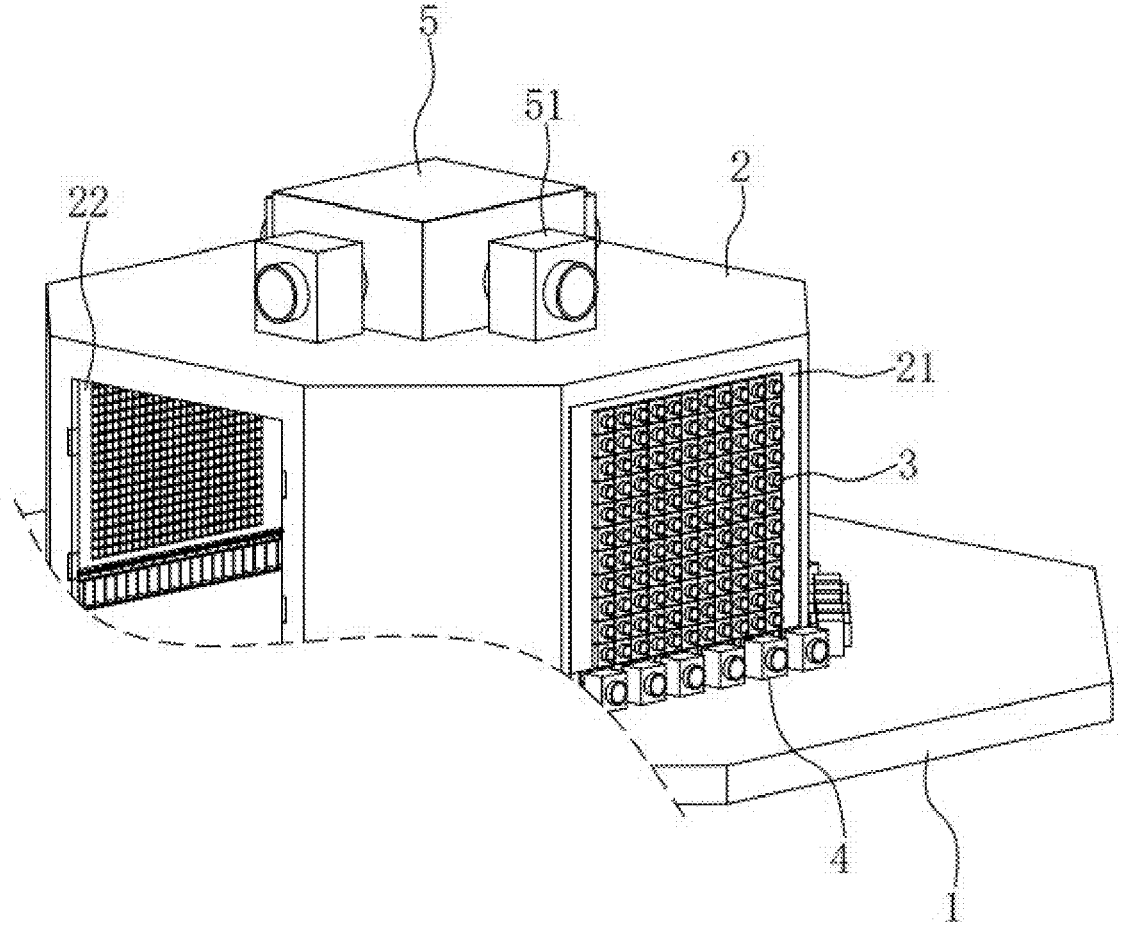
FIG. 3 is a schematic diagram of horizontal flow fans in the embodiment.
Figure 4:
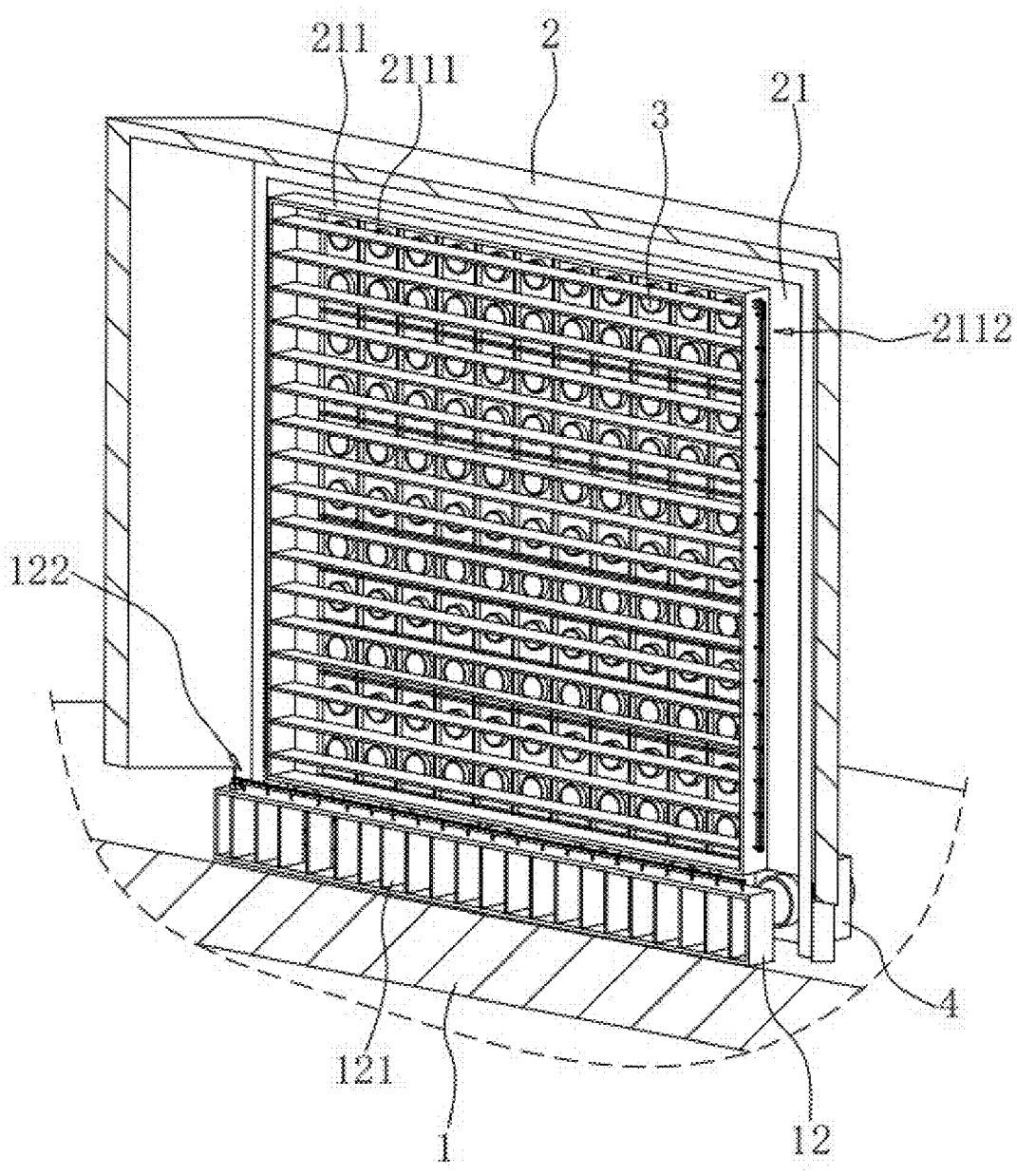
FIG. 4 is a schematic diagram of first deflectors and second deflectors in the embodiment.
Figure 5:
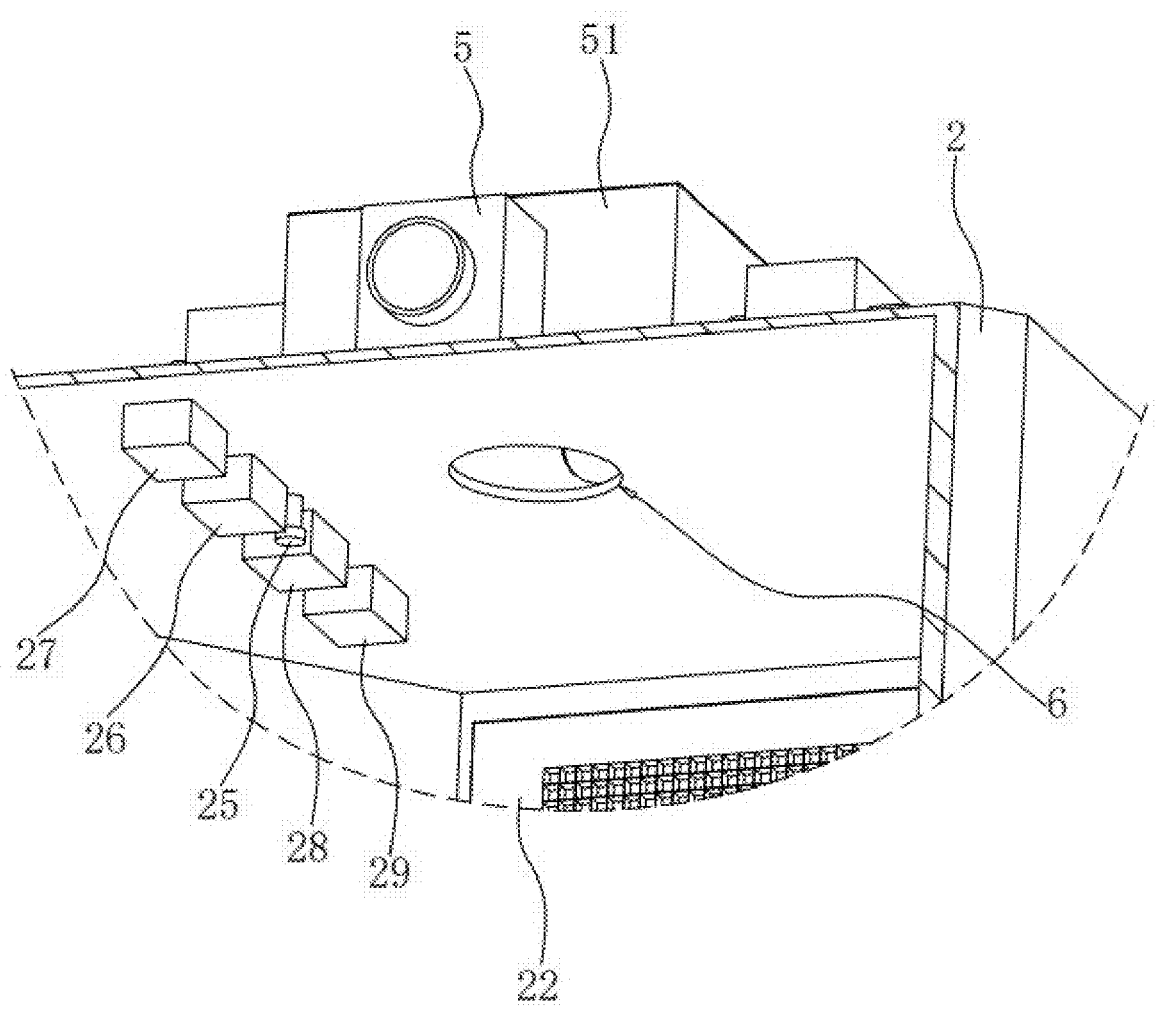
FIG. 5 is a schematic diagram of a ventilation hole in the embodiment.
Figure 6:
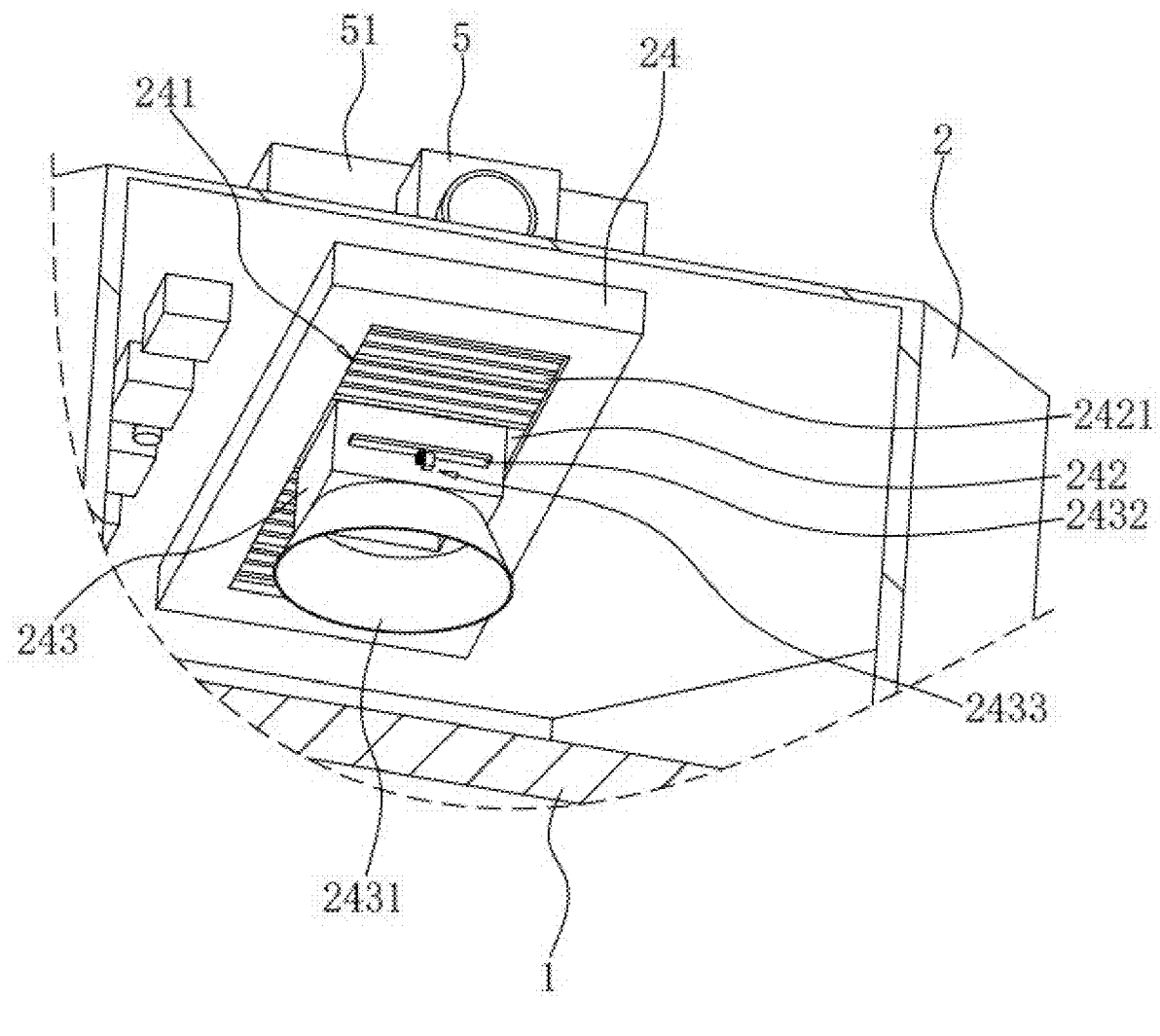
FIG. 6 is a schematic structural diagram of an air outlet tube in the embodiment.
Figure 7:
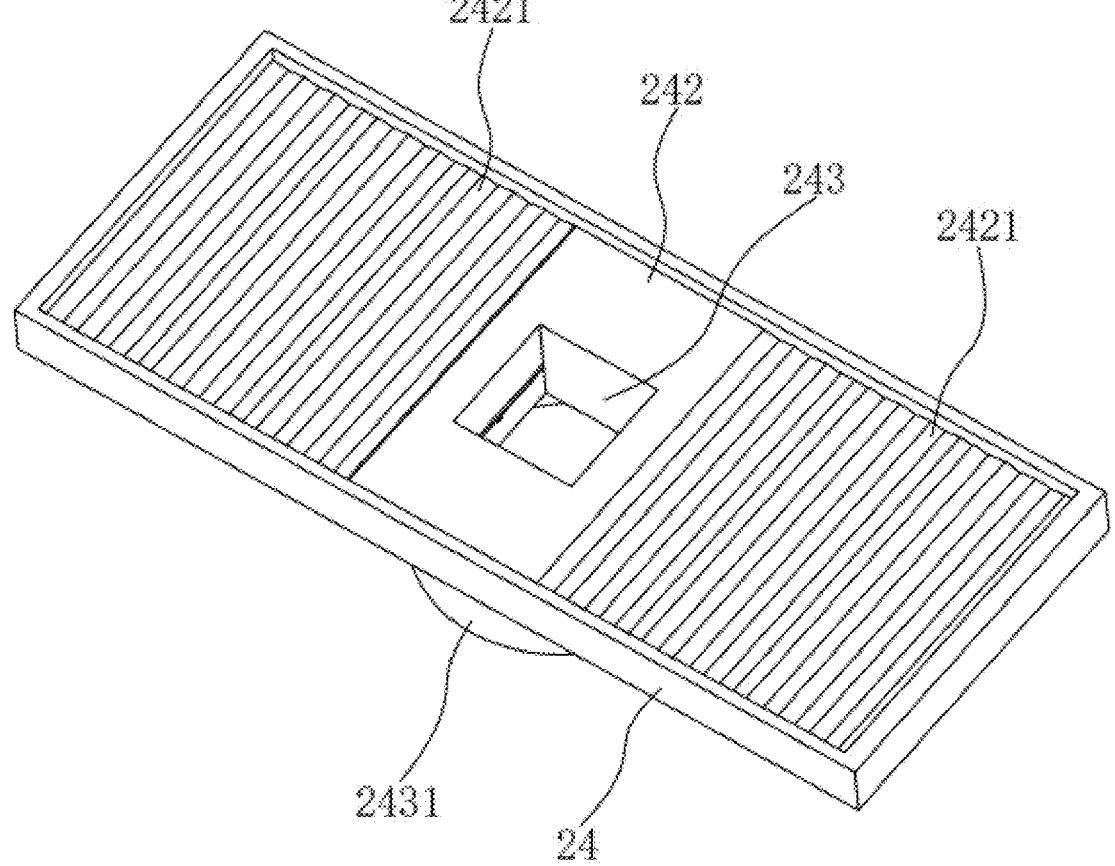
FIG. 7 is a schematic diagram of a stretchable plate in the embodiment.

Reference numerals: 1 refers to base; 11 refers to cabin body; 111 refers to first cabin door; 12 refers to second fixing frame; 121 refers to second deflector; 122 refers to second driving assembly; 1221 refers to second motor; 1222 refers to third synchronous pulley; 1223 refers to second rotating rod; 1224 refers to fourth synchronous pulley; 1225 refers to second synchronous belt; 13 refers to moving frame; 131 refers to moving fan; 132 refers to rolling wheel; 14 refers to rotary table; 2 refers to simulation cabin; 21 refers to supporting frame; 211 refers to first fixing frame; 2111 refers to first deflector; 2112 refers to first driving assembly; 21121 refers to first motor; 21122 refers to first synchronous pulley; 21123 refers to first rotating rod; 21124 refers to second synchronous pulley; 21125 refers to first synchronous belt; 22 refers to grid plate; 23 refers to second cabin door; 24 refers to hood; 241 refers to sliding groove; 242 refers to moving plate; 2421 refers to stretchable plate; 243 refers to connecting tube; 2431 refers to air outlet tube; 2432 refers to wind shield; 2433 refers to opening and closing assembly; 24331 refers to fourth motor; 24332 refers to gear; 24333 refers to rack; 244 refers to moving assembly; 2441 refers to sliding rail; 2442 refers to slider; 2443 refers to reserved groove; 2444 refers to rotating wheel; 2445 refers to third motor; 25 refers to spray nozzle; 26 refers to refrigerating module; 27 refers to heating module; 28 refers to illuminating module; 29 refers to snowing module; 3 refers to horizontal flow fan; 4 refers to rotating flow fan; 5 refers to vertical flow fan; 51 refers to fixed box; and 6 refers to ventilation hole.

DETAILED DESCRIPTION

The technical solutions in the embodiments of the present invention are clearly and completely described with reference to the drawings in the present invention. Apparently, the described embodiments are only some but not all of the embodiments of the present invention. Based on the embodiments in the present invention, all other embodiments obtained by those of ordinary skills in the art without going through any creative work should fall within the scope of protection of the present invention.

The present invention is discussed in detail with reference to FIG. 1 to FIG. 13 and specific embodiments.

As shown in FIG. 1 to FIG. 5, a multi-physics field coupling environment simulation device provided by the present invention comprises a base 1, wherein an upper surface of the base 1 is fixedly connected with a cabin body 11 and a simulation cabin 2, and the simulation cabin 2 is arranged inside the cabin body 11. In this embodiment, the cabin body 11 and the simulation cabin 2 are both an inequilateral octagon, or an equilateral octagon, an inequilateral hexagon, an equilateral hexagon, a rectangle, a cube or other shape. One side of the cabin body 11 is opened, and the opened side of the cabin body 11 is provided with a first cabin door 111.

A pair of opposite side walls of the simulation cabin 2 are both opened, wherein the opening of one side of the simulation cabin is provided with a supporting frame 21, the supporting frame 21 is fixedly connected with the simulation cabin 2, a plurality of horizontal flow fans 3 distributed at equal intervals are fixedly mounted on the supporting frame 21, the horizontal flow fan 3 is a bidirectional fan, and a space is reserved between the supporting frame 21 and the base 1; and the opening opposite to the horizontal flow fans 3 is provided with a grid plate 22, the grid plate 22 is fixedly connected with the simulation cabin 2, a space is reserved between the grid plate 22 and the base 1, and spaces are reserved between bottom portion of the remaining side walls of the simulation cabin 2 and the base 1.

One side of the simulation cabin 2 is also opened, the opening of the simulation cabin 2 is provided with a second cabin door 23, and a space is reserved between the second cabin door 23 and the base 1.

A plurality of rotating flow fans 4 are mounted on the base 1, the rotating flow fan 4 is also a bidirectional fan, the plurality of rotating flow fans 4 are arranged around the simulation cabin 2 by a circle, and the rotating flow fans 4 can blow a bottom portion of the simulation cabin 2.

One side of the supporting frame 21 close to an interior of the simulation cabin 2 is fixedly connected with a first fixing frame 211, a plurality of first deflectors 2111 are arranged inside the first fixing frame 211 in a vertical direction, and each first deflector 2111 is rotatably connected with the first fixing frame 211. The first fixing frame 211 is connected with a first driving assembly 2112, and the first driving assembly 2112 drives the first deflector 2111 to rotate, thus controlling an opening angle of the first deflector 2111. In this embodiment, the first deflectors 2111 are all controlled by the first driving assembly 2112, or the first deflectors 2111 may also be divided into multiple groups from top to bottom, wherein each group corresponds to one first driving assembly 2112, and the opening angle of each group of first deflectors 2111 is adjusted by the corresponding first driving assembly 2112.

The upper surface of the base 1 is fixedly connected with eight second fixing frames 12, and the second fixing frame 12 are arranged corresponding to the rotating flow fans 4 on each side surface. A plurality of second deflectors 121 are arranged in each second fixing frame 12, and the second deflectors 121 are distributed in a horizontal direction.

Each second fixing frame 12 is connected with a second driving assembly 122, and the second driving assembly 122 drives the second deflector 121 to rotate, thus controlling an opening angle of the second deflector 121. In this embodiment, the second deflectors 121 on the same second fixing frame 12 are all controlled by the corresponding second driving assembly 122, or the second deflectors 121 in the same second fixing frame 12 may also be divided into multiple groups in the horizontal direction, wherein each group corresponds to one second driving assembly 122, and the opening angle of each group of second deflectors 121 is adjusted by the corresponding second driving assembly 122.

A top portion of the simulation cabin 2 is fixedly connected with four vertical flow fans 5, the top portion of the simulation cabin 2 is fixedly connected with a fixed box 51, four side walls of the fixed box 51 are all fixedly communicated with the vertical flow fans 5, and the vertical flow fan 5 is also a bidirectional fan. The top portion of the simulation cabin 2 is provided with a ventilation hole 6, and the ventilation hole 6 is communicated with an interior of the fixed box 51.

Simulation of horizontal constant-speed air flow: the first driving assembly 2112 drives the first deflectors 2111 to rotate to a horizontally opened state, the horizontal flow fans

3 work, and each horizontal flow fan 3 rotates at the same speed to blow the horizontal constant-speed air flow into the simulation cabin 2.

Simulation of downburst wind/downward flow: the vertical flow fans 5 and the rotating flow fans 4 are cooperated to form the downburst wind/downward flow, the second driving assembly 122 drives the second deflectors 121 to rotate to a state parallel to the axes of the rotating flow fans 4, the vertical flow fans 5 blow air to the interior of the fixed box 51, an air flow enters downwardly into the interior of the simulation cabin 2 through the ventilation hole 6, the rotating flow fans 4 blow air to an exterior of the simulation cabin 2, since directions of the second deflectors 121 are parallel to the axes of the rotating flow fans 4, there is no rotating air volume at the bottom portion of the simulation cabin 2, which helps to form a ground-radiant high-speed air flow to achieve the simulation of the downburst wind, and air volumes of the vertical flow fans 5 and the rotating flow fans 4 are controlled to further control an intensity of the downburst wind, which is reduced to a certain extent to achieve the simulation of the downward flow.

Simulation of atmospheric boundary layer: the first driving assembly 2112 drives the first deflectors 2111 to rotate to the horizontally opened state, rotating speeds of the horizontal flow fans 3 at different heights are adjusted, the horizontal flow fans 3 blow air to the interior of the simulation cabin 2, and a wind speed field which is the same as a wind profile of the atmospheric boundary layer is formed in a height direction to achieve the simulation of the atmospheric boundary layer.

Simulation of horizontal wind shear: the first driving assembly 2112 drives the first deflectors 2111 to rotate to the horizontally opened state, rotating speeds of the horizontal flow fans 3 in the horizontal direction are adjusted, so that the rotating speeds of the horizontal flow fans 3 in the horizontal direction are different, and a linear variation of wind speed in the horizontal direction is formed to achieve the simulation of the horizontal wind shear.

Simulation of vertical wind shear: the first driving assembly 2112 drives the first deflectors 2111 to rotate to the horizontally opened state, rotating speeds of the horizontal flow fans 3 in the vertical direction are adjusted, so that the rotating speeds of the horizontal flow fans 3 in the vertical direction are different, and a linear variation of wind speed in the vertical direction is formed to achieve the simulation of the vertical wind shear.

Simulation of gust: the first driving assembly 2112 drives the first deflectors 2111 to rotate to the horizontally opened state, and air volumes of the horizontal flow fans 3 are quickly adjusted, so that a wind field in the simulation cabin 2 changes rapidly with time to achieve the simulation of the gust.

Testers may also simulate other wind field environments in nature through the cooperation of the vertical flow fans 5, the horizontal flow fans 3 and the rotating flow fans 4 according to actual needs, and common complex wind field environments in nature may be simulated through the cooperation of the vertical flow fans 5, the horizontal flow fans 3 and the rotating flow fans 4, thus achieving an effect of improving the diversity of wind tunnel tests.

As shown in FIG. 2 to FIG. 11, the top portion of the simulation cabin 2 is fixedly connected with a hood 24, a bottom portion of the hood 24 is provided with a sliding groove 241, a moving plate 242 is arranged above the sliding groove 241, and one pair of side walls of the moving plate 242 are slidably connected with an inner wall of the hood 24. A connecting tube 243 communicated with an upper surface of the moving plate 242 is integrally formed at a bottom portion of the moving plate 242, the connecting tube 243 penetrates through the sliding groove 241, a bottom portion of the connecting tube 243 is fixedly connected with an air outlet tube 2431, and the air outlet tube 2431 is funnel-shaped. A moving assembly 244 is arranged between the moving plate 242 and the hood 24, and the moving assembly 244 is used for driving the air outlet tube 2431 to move in a length direction of the sliding groove 241.

The other pair of side walls of the moving plate 242 are fixedly connected with a stretchable plate 2421, and one side of the stretchable plate 2421 far away from the moving plate 242 is fixedly connected with the inner wall of the hood 24. In this embodiment, the stretchable plate 2421 is an accordion stretchable plate 2421. When the vertical flow fans 5 blow air to or exhaust air from the interior of the fixed box 51, the stretchable plate 2421 blocks the sliding groove 241, so as to make all air flows in the hood 24 pass through the connecting tube 243 and then flow through the air outlet tube 2431 as far as possible.

Simulation of tornado: the vertical flow fans 5 and the rotating flow fans 4 are cooperated to form the tornado, the vertical flow fans 5 exhaust air in the fixed box 51, the air flow in the interior of the simulation cabin 2 is discharged through the air outlet tube 2431, an upward air flow is formed in the interior of the simulation cabin 2, the second driving assembly 122 drives the second deflectors 121 to rotate to form certain angles with the axes of the rotating flow fans 4, the rotating flow fans 4 blow air to the interior of the simulation cabin 2, a rotating air flow is formed at the bottom portion of the simulation cabin 2, the vertical flow fans 5 and the rotating flow fans 4 are cooperated to achieve the simulation of the tornado, and the moving assembly 244 drives the moving plate 242 to move, thus driving the air outlet tube 2431 to move to simulate a linear motion of the tornado.

The tornado can be simulated through the cooperation of the vertical flow fans 5 and the rotating flow fans 4, thus achieving an effect of further improving the diversity of wind tunnel tests.

A pair of side walls of the connecting tube 243 are slidably inserted with horizontally arranged wind shields 2432 respectively, when the two wind shields 2432 abut against each other, the wind shields 2432 close the connecting tube 243, and when the vertical flow fans 5 do not need to work, the connecting tube 243 is in a closed state, thus reducing a possibility of discharging the air flow through the air outlet tube 2431 when simulating other wind field environments.

An opening and closing assembly 2433 is arranged between each wind shield 2432 and the connecting tube 243, when the opening and closing assembly 2433 drives the two wind shields 2432 to move close to each other, the wind shields 2432 close the connecting tube 243, and when the opening and closing assembly 2433 drives the two wind shields 2432 to move far away from each other, the wind shields 2432 open the connecting tube 243.

An inner wall of the simulation cabin 2 is provided with a moving frame 13, a plurality of moving fans 131 are mounted on the moving frame 13, and rolling wheels 132 are mounted on a bottom portion of the moving frame 13.

Simulation of crossroad wind: the first driving assembly 2112 drives the first deflectors 2111 to rotate to the horizontally opened state, the horizontal flow fans 3 blow air to the interior of the simulation cabin 2, and the moving frame 13 is moved to make a blowing direction of the moving fans

131 perpendicular to a blowing direction of the horizontal flow fans 3, so as to simulate the crossroad wind.

The moving frame 13 is arranged to simulate the crossroad wind, thus improving the diversity of wind tunnel tests.

A spray nozzle 25 is mounted on an inner wall of the top portion of the simulation cabin 2, and according to an actual situation, the spray nozzle 25 sprays water to simulate a raining environment, and a volume of water sprayed is used to simulate a rainfall intensity. A refrigerating module 26 and a heating module 27 are mounted on the top portion of the simulation cabin 2, and according to an actual situation, the refrigerating module 26 cools the interior of the simulation cabin 2 to simulate a low-temperature environment. According to an actual situation, the heating module 27 heats the interior of the simulation cabin 2 to simulate a high-temperature environment. In this embodiment, the refrigerating module 26 is a refrigeration compressor, an air conditioner or other equipment capable of refrigeration, and the heating module 27 is an electric heater or other equipment capable of heating. The spray nozzle 25 and the horizontal flow fans 3 are cooperated to simulate a wind and rain environment, and the spray nozzle 25 and the refrigerating module 26 are cooperated to simulate a freezing rain and ice accretion environment when a temperature in the simulation cabin 3 is low. An illuminating module 28 is mounted on the top portion of the simulation cabin 2, and the illuminating module 28 is configured for simulating an intensity of solar radiation. In this embodiment, the illuminating module 28 is an illuminating lamp. A snowing module 29 is also mounted on the top portion of the simulation cabin 2, and the snowing module 29 is configured for simulating a snowy environment. In this embodiment, the snowing module 29 is a snow maker.

Different wind field environments are simulated according to actual needs, rain, snow, freezing rain and ice accretion, and different temperature environments are chosen according to actual conditions, and then the vertical flow fans 5, the horizontal flow fans 3, the rotating flow fans 4 and the moving fans 131 are cooperated to simulate complex environments of three-dimensional multi-physics field coupling under different weather, thus improving the diversity of wind tunnel tests.

A rotary table 14 is arranged in a middle portion of the base 1, the rotary table 14 is driven to rotate by a driving motor (not shown in the figures) at the bottom portion, the rotary table 14 is used for bearing a test piece, and a rotation angle of the rotary table 14 is adjusted by the driving motor to carry out tests in coordination with different wind field environments, thus increasing the diversity of wind tunnel tests.

Figure 12:
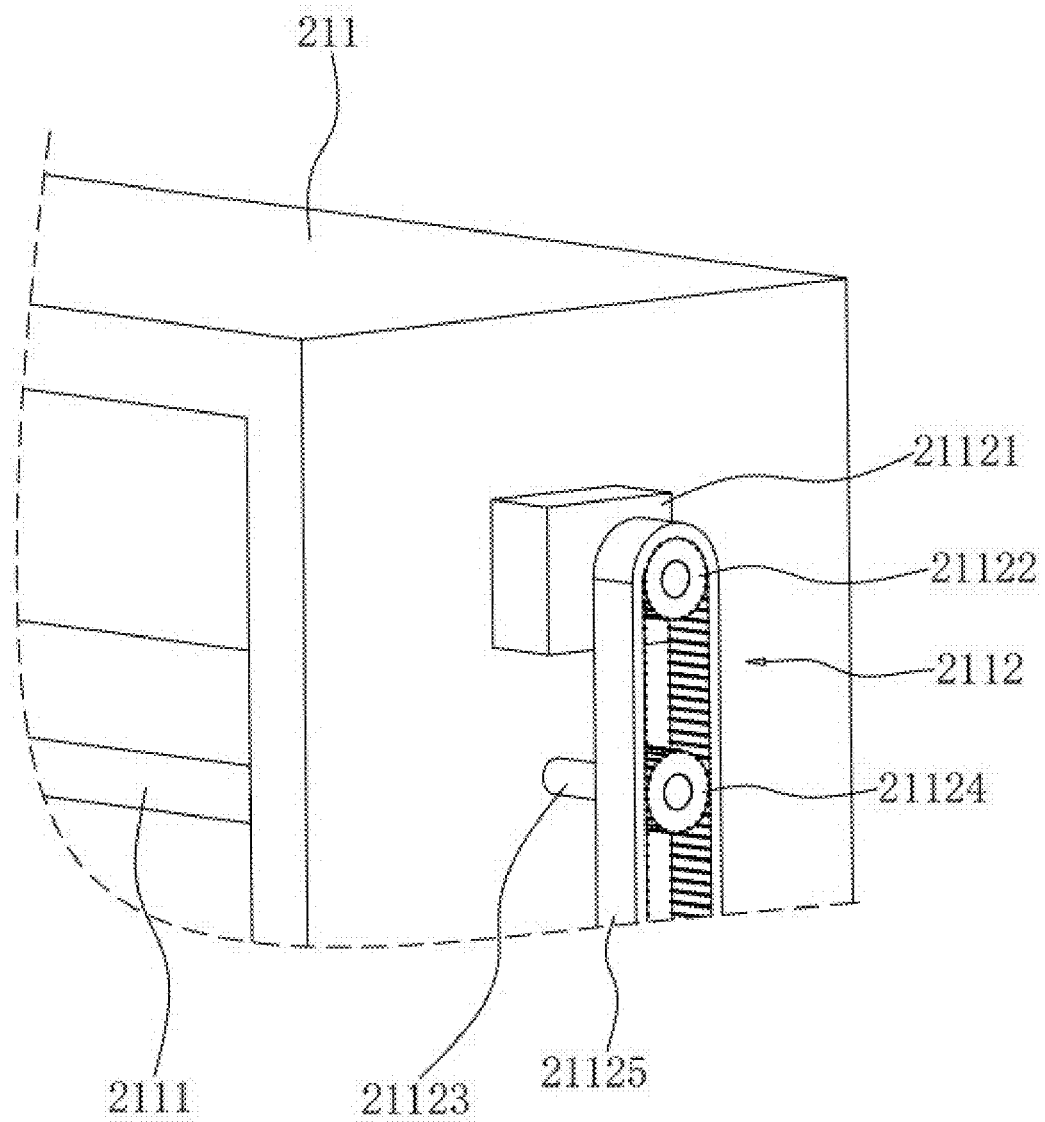
FIG. 12 is a schematic diagram of a first synchronous belt in the embodiment.

As shown in FIG. 12, the first driving assembly 2112 comprises a first motor 21121 fixedly connected with a side wall of the first fixing frame 211, and an output shaft of the first motor 21121 is fixedly connected with a first synchronous pulley 21122. Two sides of each first deflector 2111 are both fixedly connected with a first rotating rod 21123, and the first rotating rod 21123 is rotatably connected with the first fixing frame 211. The first rotating rods 21123 on one side close to the first motor 21121 are all fixedly connected with a second synchronous pulley 21124, and the first synchronous pulley 21122 and the second synchronous pulleys 21124 are connected by a first synchronous belt 21125.

The output shaft of the first motor 21121 drives the first synchronous pulley 21122 to rotate, the first synchronous pulley 21122 drives the second synchronous pulleys 21124 to rotate through the first synchronous belt 21125, and the second synchronous pulleys 21124 further drive the first deflectors 2111 to rotate.

Figure 13:
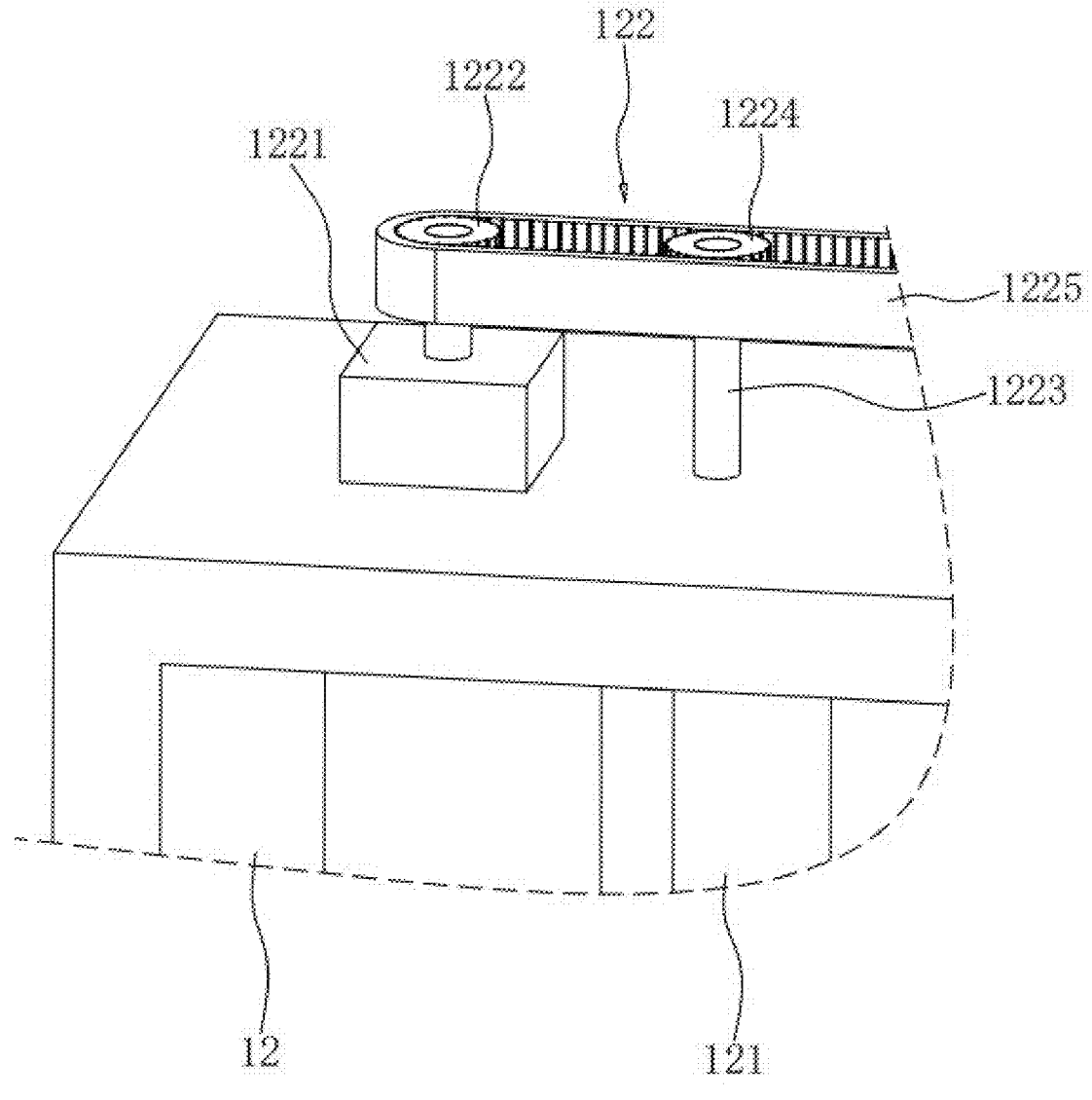
FIG. 13 is a schematic diagram of a second synchronous belt in the embodiment.

As shown in FIG. 13, the second driving assembly 122 comprises a second motor 1221 fixedly connected with a side wall of the second fixing frame 12, and an output shaft of the second motor 1221 is fixedly connected with a third synchronous pulley 1222. Two sides of each second deflector 121 are both fixedly connected with a second rotating rod 1223, and the second rotating rod 1223 is rotatably connected with the second fixing frame 12. The second rotating rods 1223 on one side close to the second motor 1221 are all fixedly connected with a fourth synchronous pulley 1224, and the third synchronous pulley 1222 and the fourth synchronous pulleys 1224 are connected by a second synchronous belt 1225.

The output shaft of the second motor 1221 drives the third synchronous pulley 1222 to rotate, the third synchronous pulley 1222 drives the fourth synchronous pulleys 1224 to rotate through the second synchronous belt 1225, and the fourth synchronous pulleys 1224 drive the second deflectors 121 to rotate through the second rotating rods 1223.

Figure 8:
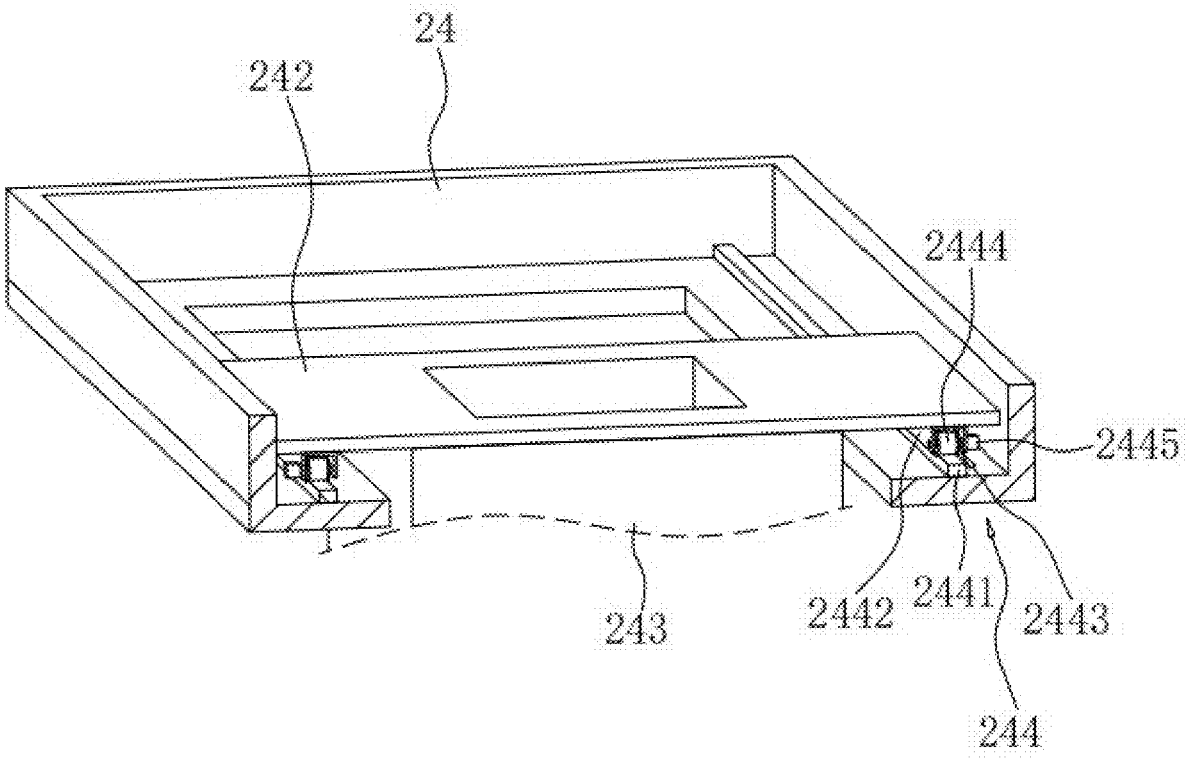
FIG. 8 is a schematic diagram of rotating wheels in the embodiment.

As shown in FIG. 8, the moving assembly 244 comprises a pair of sliding rails 2441 fixedly connected with an inner wall of the bottom portion of the hood 24, a lower surface of the moving plate 242 is fixedly connected with a pair of sliders 2442, and the sliders 2442 are arranged in one-to-one correspondence with the sliding rails 2441. A lower surface of each slider 2442 is upwardly provided with a reserved groove 2443, rotating wheels 2444 in rolling connection with the sliding rail 2441 are arranged in positions far away from each other in the reserved groove 2443, and there are two rotating wheels 2444 in each reserved groove 2443. A side wall of each slider 2442 is fixedly connected with two third motors 2445, the third motors 2445 are arranged in one-to-one correspondence with the rotating wheels 2444, and output shafts of the third motors 2445 are fixedly connected with the rotating wheels 2444. The output shafts of the third motors 2445 drive the rotating wheels 2444 to rotate, and the rotating wheels 2444 further drive the moving plate 242 to move.

Figure 9:
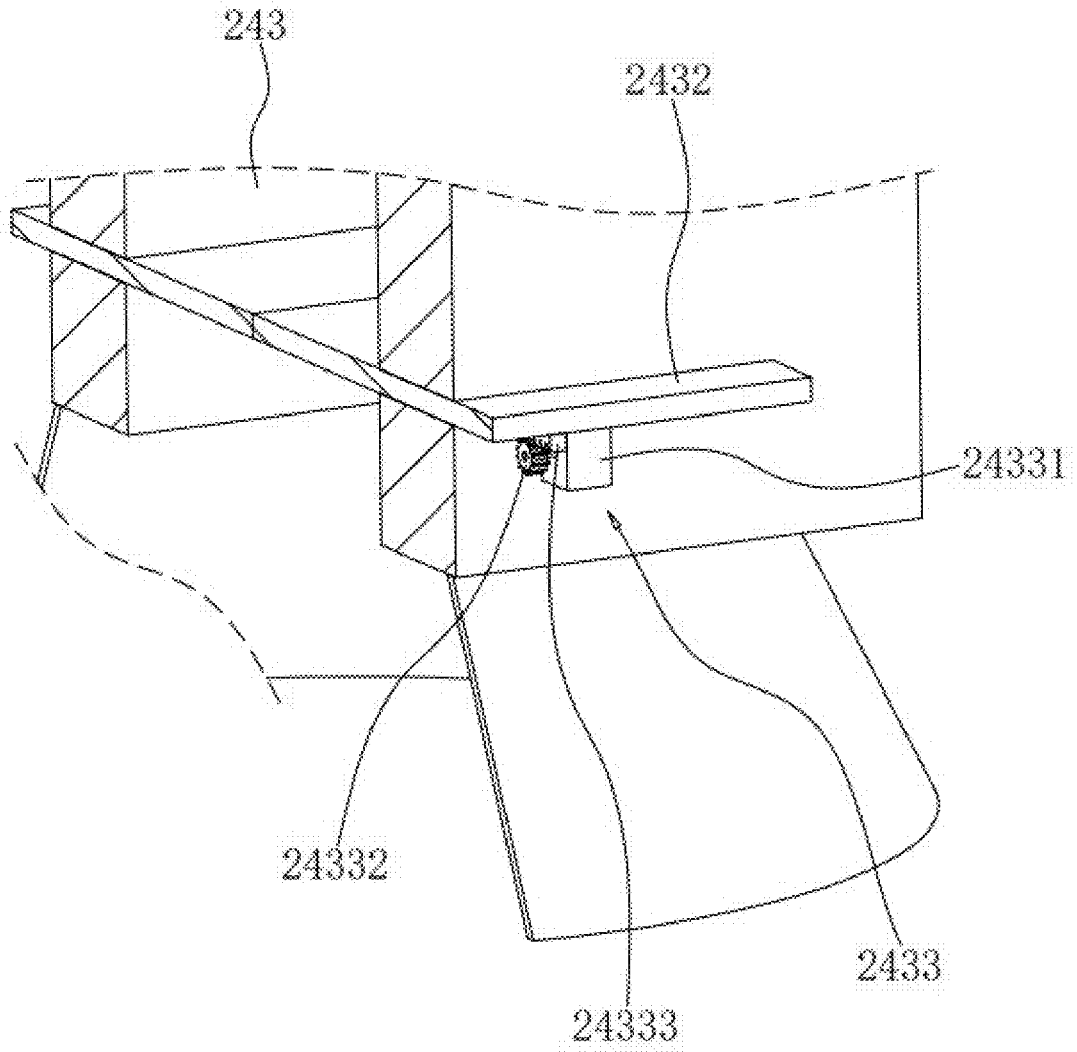
FIG. 9 is a schematic diagram of a gear and a rack in the embodiment.
Figure 10:
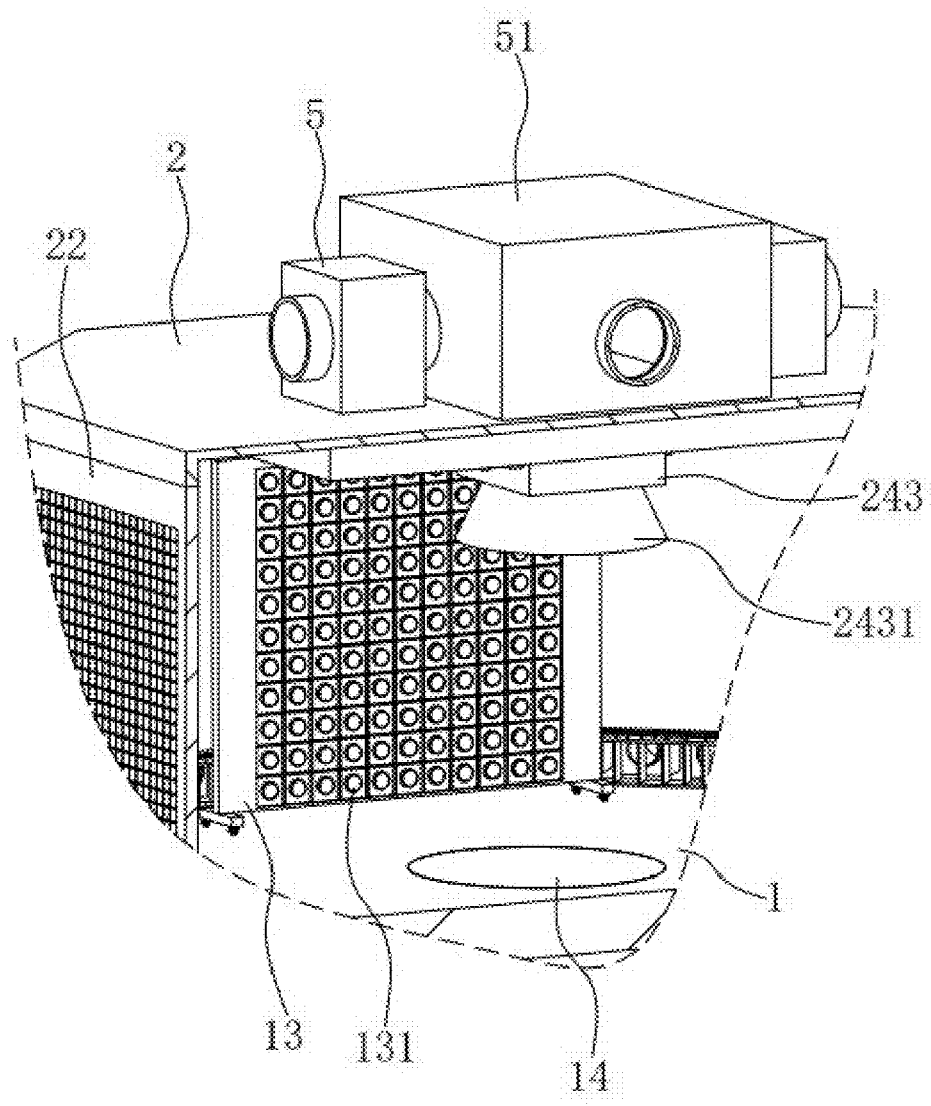
FIG. 10 is a schematic diagram of moving fans in the embodiment.
Figure 11:
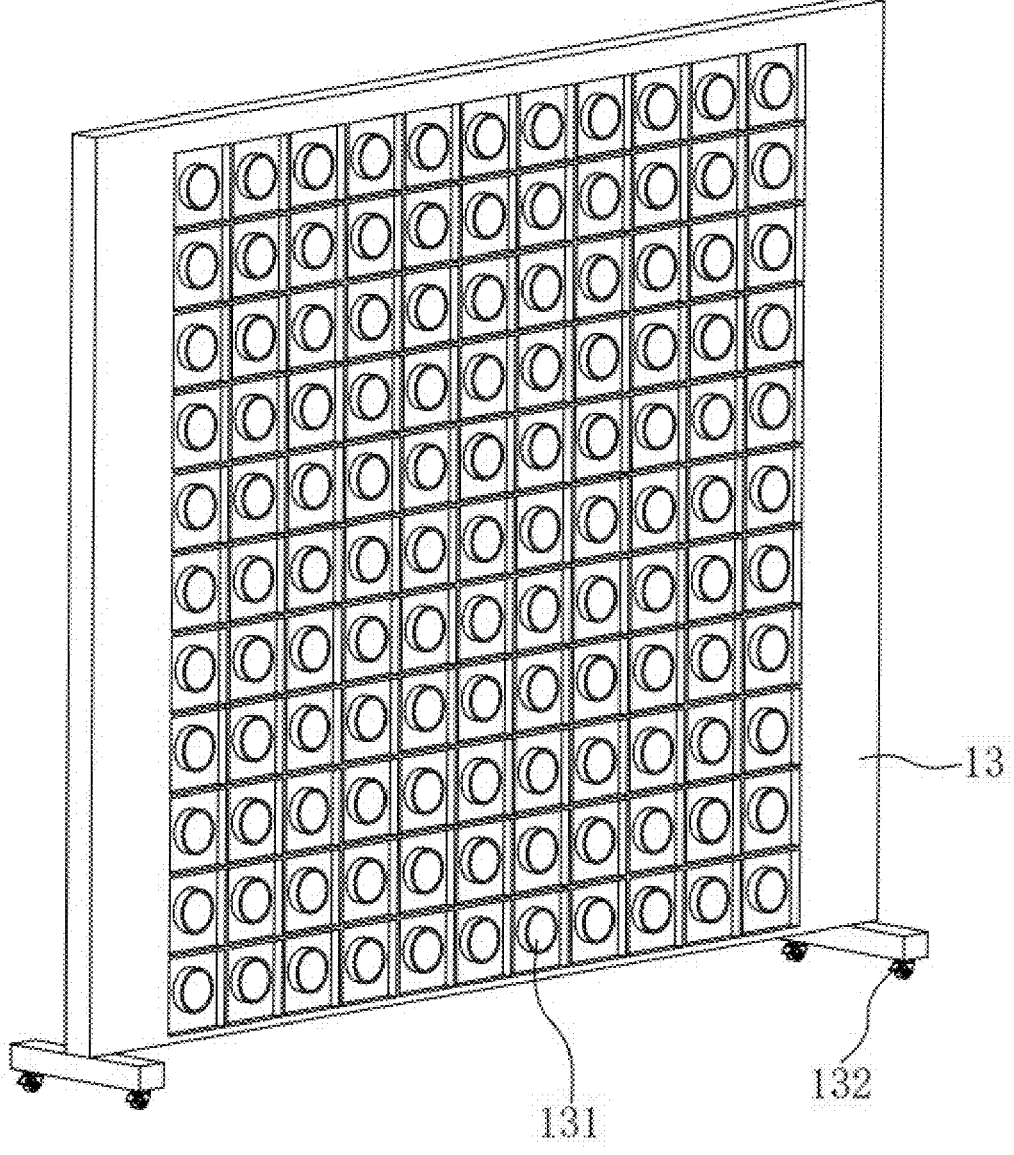
FIG. 11 is a schematic diagram of rolling wheels in the embodiment.

As shown in FIG. 9, the opening and closing assembly 2433 comprises a fourth motor 24331 fixedly connected with a side wall of the connecting tube 243, and an output shaft of the fourth motor 24331 is fixedly connected with a gear 24332. A lower surface of the wind shield 2432 is fixedly connected with a rack 24333, the rack 24333 is engaged with the gear 24332, and the rack 24333 is slidably inserted with the connecting tube 243. The output shaft of the fourth motor 24331 drives the gear 24332 to rotate, the rotation of the gear 24332 drives the rack 24333 to move, and the movement of the rack 24333 further drives the wind shield 2432 to move.

An implementation principle of the multi-physics field coupling environment simulation device provided by the present invention is as follows.

Simulation of horizontal constant-speed air flow: the first deflectors 2111 are in a horizontally opened state, the horizontal flow fans 3 work, and each horizontal flow fan 3 rotates at the same speed to blow the horizontal constant-speed air flow into the simulation cabin 2.

Simulation of downburst wind/downward flow: the vertical flow fans 5 and the rotating flow fans 4 are cooperated to form the downburst wind/downward flow, the second deflectors 121 are in a state parallel to the axes of the rotating flow fans 4, the vertical flow fans 5 blow air to the interior of the fixed box 51, an air flow enters downwardly into the interior of the simulation cabin 2 through the ventilation hole 6, and the rotating flow fans 4 blow air to an exterior of the simulation cabin 2, which helps to form a ground-radiant high-speed air flow to achieve the simulation of the downburst wind, and air volumes of the vertical flow fans 5 and the rotating flow fans 4 are controlled to further control an intensity of the downburst wind, which is reduced to a certain extent to achieve the simulation of the downward flow.

Simulation of atmospheric boundary layer: the first deflectors 2111 are in the horizontally opened state, rotating speeds of the horizontal flow fans 3 at different heights are adjusted, the horizontal flow fans 3 blow air to the interior of the simulation cabin 2, and a wind speed field which is the same as a wind profile of the atmospheric boundary layer is formed in a height direction to achieve the simulation of the atmospheric boundary layer.

Simulation of horizontal wind shear: the first deflectors 2111 are in the horizontally opened state, rotating speeds of the horizontal flow fans 3 in the horizontal direction are adjusted, so that the rotating speeds of the horizontal flow fans 3 in the horizontal direction are different, and a linear variation of wind speed in the horizontal direction is formed to achieve the simulation of the horizontal wind shear.

Simulation of vertical wind shear: the first deflectors 2111 are in the horizontally opened state, rotating speeds of the horizontal flow fans 3 in the vertical direction are adjusted, so that the rotating speeds of the horizontal flow fans 3 in the vertical direction are different, and a linear variation of wind speed in the vertical direction is formed to achieve the simulation of the vertical wind shear.

Simulation of gust: the first deflectors 2111 are in the horizontally opened state, and air volumes of the horizontal flow fans 3 are quickly adjusted, so that a wind field in the simulation cabin 2 changes rapidly with time to achieve the simulation of the gust.

Simulation of tornado: the vertical flow fans 5 and the rotating flow fans 4 are cooperated to form the tornado, the vertical flow fans 5 exhaust air in the fixed box 51, the air flow in the interior of the simulation cabin 2 is discharged through the air outlet tube 2431, an upward air flow is formed in the interior of the simulation cabin 2, the second deflectors 121 form certain angles with the axes of the rotating flow fans 4, the rotating flow fans 4 blow air to the interior of the simulation cabin 2, the vertical flow fans 5 and the rotating flow fans 4 are cooperated to achieve the simulation of the tornado, and the moving plate 242 moves, thus driving the air outlet tube 2431 to move to simulate a linear motion of the tornado.

Simulation of crossroad wind: the first deflectors 2111 are in the horizontally opened state, the horizontal flow fans 3 blow air to the interior of the simulation cabin 2, and the moving frame 13 is moved to make a blowing direction of the moving fans 131 perpendicular to a blowing direction of the horizontal flow fans 3, so as to simulate the crossroad wind.

The present invention is further described above with reference to specific embodiments, but it should be understood that the specific description herein should not be construed as limiting the essence and scope of the present invention, and various modifications made to the above embodiments by those of ordinary skills in the art after reading the specification belong to the scope of protection of the present invention.

What is claimed is:

1. A multi-physics field coupling environment simulation device, comprising a base (1), wherein an upper surface of the base (1) is fixedly connected with a simulation cabin (2), one side wall of the simulation cabin (2) is provided with a plurality of horizontal flow fans (3), a plurality of rotating flow fans (4) arranged around the simulation cabin (2) by a circle are mounted on the upper surface of the base (1), and a top portion of the simulation cabin (2) is provided with a plurality of vertical flow fans (5);

the simulation cabin (2) is fixedly connected with a supporting frame (21) for supporting the horizontal flow fans (3), one side of the supporting frame (21) close to an interior of the simulation cabin (2) is fixedly connected with a first fixing frame (211), a plurality of first deflectors (2111) distributed in a vertical direction are rotatably connected in the first fixing frame (211), the upper surface of the base (1) is fixedly connected with a plurality of second fixing frames (12), and each second fixing frame (12) is rotatably connected with a plurality of second deflectors (121) distributed in a horizontal direction;

the top portion of the simulation cabin (2) is fixedly connected with a fixed box (51) communicated with the vertical flow fans (5), the top portion of the simulation cabin (2) is provided with a ventilation hole (6) communicated with the fixed box (51), a hood (24) is fixedly connected inside the top portion of the simulation cabin (2), a bottom portion of the hood (24) is provided with a sliding groove (241), a moving plate (242) is arranged in the hood (24), a bottom portion of the moving plate (242) is connected with a connecting tube (243) which is communicated with the moving plate (252) and penetrates through the sliding groove (241), and a bottom portion of the connecting tube (243) is fixedly connected with an air outlet tube (2431);

a first driving assembly (2112) for adjusting an angle of the first deflector (2111) is arranged between the first fixing frame (211) and the first deflector (2111);

a second driving assembly (122) for adjusting an angle of the second deflector (121) is arranged between the second fixing frame (12) and the second deflector (121);

a moving assembly (244) for driving the moving plate (242) to move is arranged between the moving plate (242) and the hood (24); and a pair of side walls of the connecting tube (243) are slidably inserted with a pair of wind shields (2432) respectively, and an opening and closing assembly (2433) is arranged between each wind shield (2432) and the side wall of the connecting tube (243).

2. The multi-physics field coupling environment simulation device according to claim 1, wherein a moving frame (13) is arranged in the simulation cabin (2), and a plurality of moving fans (131) are mounted on the moving frame (13).

3. The multi-physics field coupling environment simulation device according to claim 2, wherein a spray nozzle (25), a refrigerating module (26), a heating module (27), an illuminating module (28) and a snowing module (29) are mounted in the simulation cabin (2).

4. The multi-physics field coupling environment simulation device according to claim 2, wherein the base (1) is provided with a rotary table (14).

5. The multi-physics field coupling environment simulation device according to claim 1, wherein the upper surface of the base (1) is fixedly connected with a cabin body (11) arranged outside the simulation cabin (2).

6. The multi-physics field coupling environment simulation device according to claim 1, wherein a spray nozzle (25), a refrigerating module (26), a heating module (27), an illuminating module (28) and a snowing module (29) are mounted in the simulation cabin (2).

7. The multi-physics field coupling environment simulation device according to claim 1, wherein a stretchable plate (2421) for covering the sliding groove (241) is arranged between a side wall of the moving plate (242) and an inner wall of the hood (24).

8. The multi-physics field coupling environment simulation device according to claim 1, wherein the first driving assembly (2112) comprises a first motor (21121) fixedly connected with a side wall of the first fixing frame (211), an output shaft of the first motor (21121) is fixedly connected with a first synchronous pulley (21122), a side wall of the first deflector (2111) is fixedly connected with a first rotating rod (21123) rotatably connected with the first fixing frame (211), the first rotating rod (21123) is fixedly connected with a second synchronous pulley (21124), and the first synchronous pulley (21122) and the second synchronous pulley (21124) are connected by a first synchronous belt (21125).

9. The multi-physics field coupling environment simulation device according to claim 1, wherein the second driving assembly (122) comprises a second motor (1221) fixedly connected with a side wall of the second fixing frame (12), an output shaft of the second motor (1221) is fixedly connected with a third synchronous pulley (1222), a side wall of the second deflector (121) is fixedly connected with a second rotating rod (1223) rotatably connected with the second fixing frame (12), the second rotating rod (1223) is fixedly connected with a fourth synchronous pulley (12224), and the third synchronous pulley (1222) and the fourth synchronous pulley (1224) are connected by a second synchronous belt (1225).

10. The multi-physics field coupling environment simulation device according to claim 1, wherein the moving assembly (244) comprises a pair of sliding rails (2441) fixedly connected with an inner wall of the bottom portion of the hood (24), a lower surface of the moving plate (242) is fixedly connected with a slider (2442) corresponding to the sliding rail (2441), a lower surface of the slider (2442) is provided with a reserved groove (2443), a plurality of rotating wheels (2444) abutting against the sliding rail (2441) are arranged in the reserved groove (2443), a side wall of the slider (2442) is fixedly connected with a third motor (2445) corresponding to the rotating wheels (2444), and an output shaft of the third motor (2445) is fixedly connected with the rotating wheels (2444).

11. The multi-physics field coupling environment simulation device according to claim 1, wherein the opening and closing assembly (2433) comprises a fourth motor (24331) fixedly connected with the side wall of the connecting tube (243), an output shaft of the fourth motor (24331) is fixedly connected with a gear (24332), a lower surface of the wind shield (2432) is fixedly connected with a rack (24333) engaged with the gear (24332), and the rack (24333) is slidably inserted with the connecting tube (243).

* * * * *